United States Patent [19]
Loyd

[11] 4,219,980
[45] * Sep. 2, 1980

[54] REINFORCED COMPOSITE STRUCTURE AND METHOD OF FABRICATION THEREOF

[75] Inventor: Morris S. Loyd, Northridge, Calif.

[73] Assignee: Rockwell International Corporation, El Segundo, Calif.

[*] Notice: The portion of the term of this patent subsequent to Aug. 29, 1995, has been disclaimed.

[21] Appl. No.: 929,136

[22] Filed: Aug. 21, 1978

Related U.S. Application Data

[63] Continuation-in-part of Ser. No. 828,122, Aug. 26, 1977, Pat. No. 4,109,435.

[51] Int. Cl.² .............................................. E04C 2/02
[52] U.S. Cl. ..................... 52/309.1; 52/582; 52/631; 52/729; 52/785; 156/92; 403/266; 428/99
[58] Field of Search ................. 52/309.1, 309.2, 309.7, 52/309.16, 582, 631, 729, 785, 828; 85/21; 156/73.1, 92; 403/265–267, 219; 428/99, 100, 102

[56] References Cited

U.S. PATENT DOCUMENTS

| | | | |
|---|---|---|---|
| 1,385,387 | 7/1921 | Morandi | 52/631 X |
| 1,999,409 | 4/1935 | Fox | 156/92 |
| 2,245,497 | 6/1941 | Potchen | 52/828 |
| 2,655,459 | 10/1953 | Gordon et al. | 156/92 |
| 3,184,353 | 5/1965 | Balamuth et al. | 156/92 |
| 3,353,317 | 11/1967 | Ensor | 52/309.2 |
| 3,570,074 | 3/1971 | Schimmeyer et al. | 403/267 |
| 3,837,985 | 9/1974 | Chase | 156/92 X |
| 3,871,149 | 3/1975 | Georgi | 52/785 X |
| 4,010,300 | 3/1977 | Wallin | 156/92 X |
| 4,109,435 | 8/1978 | Loyd | 52/309.1 |

FOREIGN PATENT DOCUMENTS

| | | | |
|---|---|---|---|
| 1924863 | 11/1970 | Fed. Rep. of Germany | 52/309.1 |
| 545908 | 8/1922 | France | 85/21 |

*Primary Examiner*—Alfred C. Perham
*Attorney, Agent, or Firm*—Charles T. Silberberg

[57] ABSTRACT

A composite structure is reinforced and assembled utilizing barbed quill fasteners. By using such fasteners, the structure can be formed while in a staged condition. This allows co-curing and bonding of the elements of the structure in a joined condition. Additionally, by virtue of the use of the barbed quills and their being strategically implanted in the structure, peel forces in the structural joint are minimized.

17 Claims, 6 Drawing Figures

REINFORCED COMPOSITE STRUCTURE AND METHOD OF FABRICATION THEREOF

This application is a continuation-in-part of my co-pending application, Ser. No. 828,122, filed Aug. 26, 1977 now U.S. Pat. No. 4,109,435.

BACKGROUND OF THE INVENTION

The present invention generally relates to a reinforced composite structure. More particularly, the invention is directed to a composite structure which is reinforced and assembled utilizing barbed quills. The quills, by holding together the formed details, allow assembly of the composite structure while in a staged condition such that the entire structure can be co-cured in one operation. By virtue of the implanted quills, the finally formed composite structure is substantially strengthened as a result of the peel forces in the joint being minimized.

Usage of composite materials in structures has been increasing rapidly. This is particularly true in the aerospace industry where the lightweight, high strength characteristics of these materials are particularly desirable. In this art, strong, lightweight, tough, self-sustaining sheet material has been developed, these materials being composed as a class, of a resinous sheet reinforced with layers of continuous, lineally aligned, parallel filaments. These sheets can be formed as a single layer sheet or as multi-layer laminates, and thereafter thermoset to tough, hard, exceptionally strong panels, or skins for aircraft and the like.

As initially formed, these sheet materials are flexible and deformable, providing panel-forming members which can be draped or otherwise conformed to various shapes and thereafter cured, by thermosetting, upon the application of heat and pressure thereto, to tough, strong skins or panels of permanent shape retention and having exceptional tensile strength imparted by the continuous filament reinforcing.

Panels or skins made up of these materials are exceptionally strong, lightweight structural units. However, structural joints made by the inclusion of reinforcing ribs or the like on such panels have heretofore seen limited applicability. Presently, these skins or panels are typically joined by first curing the sheet material into the desired shape and adhesively bonding a web or rib structure to the panel through the medium of a thermosetting adhesive.

However, as previously stated, uncured composite structure is flexible and deformable. When curing large combined structural members, such as an aircraft wing box, difficulties have resulted in holding the parts in place, especially when transporting an uncured structure to an autoclave or oven. Further, it has been found that tension loads, at unacceptably low values, on the cured panel or skin of the composite structure result in "peel" forces which tend to separate the web and panel of the structure at their interface.

PRIOR ART STATEMENT

Due to the formable nature of uncured composite laminated sheets, the current practice has been to individually cure the elements of the structure prior to assembling the structure. As such, the structure is not assembled until the individual parts are cured. A further bonding or fastening operation is necessary once the structure is assembled. Various attempts have been made to solve the peeling problem in bonded joints under tension load. Thus, metal rivets and bolts have been used as fasteners at the interface of the composite rib/sheet joints. Unfortunately, this has increased the weight of the resulting structure, increased fabrication time, required more plies of material due to the reduced laminate strength resulting from the necessary drilled fastener holes, and presented sealing problems where the panel forms part of a container, such as a fuel tank. Imbedding a metal "T" element into a joint has also been utilized. This has also been found to be unsatisfactory in that the element is expensive, increases the weight of the structure, requires a critical priming operation, is incompatible with the surrounding material due to its higher thermal co-efficient of expansion, and is too rigid, thereby resulting in a notch effect.

Applicant has found that the barbed quills according to the present invention can be easily inserted into the staged structure with minimal disturbance to the fibers and hold together the elements of the staged structure because of the barbs becoming anchored in the composite fibers. With bolts or rivets, holes must be drilled in the elements of the structure which cuts the composite fibers, and are subject to the above noted disadvantages. Further, there is normally no access to install corresponding fastener nuts (with of course the additional configuration problems due to protrusion of the nut). Moreover, the composite elements are too soft, even in the staged condition, for efficient hole drilling and for the bolts to effectively grip the material. It has also been found that quills according to the present invention are cheaper and lighter than bolts or rivets, can be implanted into the structure much quicker, do not waste material in that no holes are required, and result in only minimal disturbance to the composite fibers. In addition, when strategically placed, the barbed quills add strength to the structure. This is accomplished by the elimination of need for holes and the avoidance of tearing of the fibers.

SUMMARY OF THE INVENTION

It is therefore, an object of the present invention, to provide a reinforced composite structure with increased resistance to peel forces at the joint interface.

It is another object of the present invention to provide an efficiently fastened staged composite structure with unimpaired structural strength.

It is still another object of the present invention to provide a method of fabrication which results in a reinforced composite structure and allows co-curing of the assembly.

Briefly, in accordance with the invention, there is provided a reinforced composite structure comprising a staged composite panel, a staged composite web, and a plurality of quills infixed in the panel and web. The quills have barbs thereon which engage the fibers of the panel and the web. The quills join the panel to the web such that the structure can be co-cured as assembled. Optimally, the quills are positioned such that the structure is reinforced when cured. Optionally, a composite reinforcement member in the form of a generally wedge-shaped laminate is provided. In this case, the reinforcement member would be bonded to the panel and web and also have the quills infixed therein.

In another form of the invention, there is provided a composite structure comprising a composite panel, a composite web, a composite reinforcement member, and a plurality of barbed quills infixed in the panel, the reinforcement member, and the web.

In still another form of the present invention, a method is provided which comprises staging of the composite panel and web, positioning the panel relative to the web, infixing a plurality of quills in said panel and said web while they are in a staged condition such that the web and panel are joined, and co-curing the web and panel as joined.

While the invention will be described in connection with the preferred embodiments, it will be understood that it is not intended to limit the invention to those embodiments. On the contrary, it is intended to cover all alternatives, modifications, and equivalents that may be included within the spirit and scope of the invention as defined by the appended claims.

DETAILED DESCRIPTION OF THE INVENTION

Figure 1:
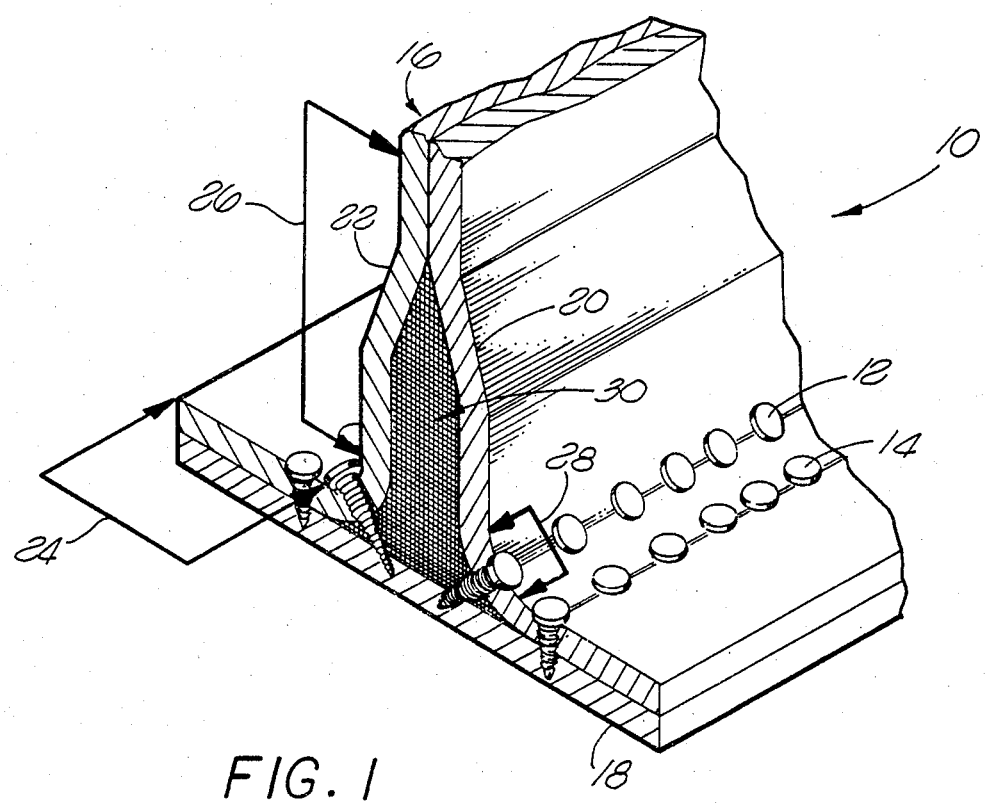
FIG. 1 is a perspective view of a composite structural joint according to the present invention having headed barbed quill fasteners implanted therein.

Referring now to FIG. 1, there is shown according to the present invention a reinforced composite structure generally indicated at 10. Structure 10 utilizes headed barbed quills 12 and 14, which are more fully described with reference to FIGS. 2 and 3, to reinforce the structural joint which is defined by a composite web generally indicated at 16 and composite panel or skin 18. Both web 16 and panel 18 are normally laminates of a plurality of fiber composite plies. Web 16 is made up of opposed composite sheets 20 and 22. A portion 24 of each of sheets 20 and 22 is positioned parallel and adjacent to panel 18. A second portion 26 of sheets 20 and 22 extends transversely to panel 18. In the embodiment illustrated in FIG. 1, the second portion 26 is approximately orthogonally disposed to panel 18. Sheets 20 and 24 also have a fillet portion 28 between first portion 24 and second portion 26. Positioned between sheets 20 and 22 of web 16 and panel 18 is a composite filler material 30. A thermosetting adhesive is placed on the contacting surfaces of web 16, panel 18, and filler 30, but is not sufficient to hold these members in assembled condition at room temperature prior to curing.

In the uncured condition, the composite sheet materials are flexible and deformable. After conforming them to the desired shape, the composite members are, according to the present invention, staged which gives them a stiffness at room temperature which allows the members to be assembled and fastened to the desired form utilizing the quills herein described. Staging is accomplished by heating to a temperature normally less than the curing temperature and compressing the composite members. Specifically, it has been found that graphite epoxy laminates can be heated to a temperature of about 175° F. for about 30 minutes to one hour while simultaneously compressed to cause bleeding (getting rid of excess resin) to result in a member which is suitably staged for the present invention.

In this staged condition, the composite members will still normally be too soft to allow the installation of bolts in view of the difficulty of hole drilling. In any case, as previously mentioned, hole drilling is time consuming, wastes material, results in fuel sealing problems, cuts the composite fibers, requires the use of extra plies, and does not overcome the problem of access to apply to corresponding nuts and bolts.

Figure 2:
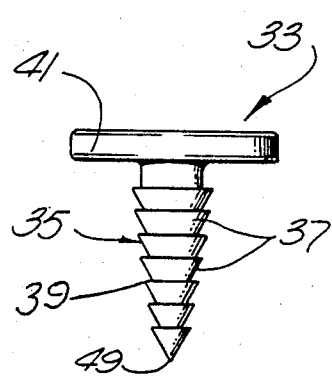
FIG. 2 is a perspective view of a barbed quill according to the present invention.
Figure 3:
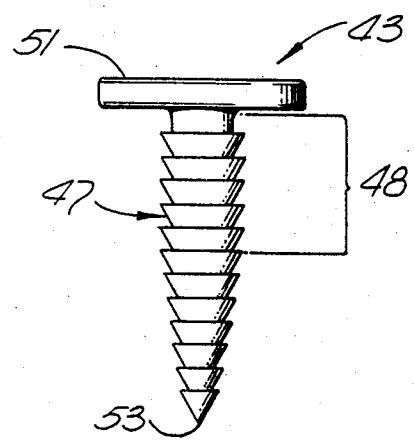
FIG. 3 is a perspective view of another form of barbed quill.

FIGS. 2 and 3 illustrate barbed quills according to the present invention. In FIG. 2, the quill generally indicated by 33 has a head 41 and a rod portion 35 preferably perpendicular to head 41. Rod 35 is preferably tapered to allow easy insertion into the staged composite panel and web. The distal end 49 of rod 35 is pointed. By virtue of the pointed distal end 49 and taper of rod 35, the fibers of the composite laminates are spread rather than torn on insertion therein of the quills. As a result, structural strength is not impaired. Convolutions of conical barbs 37 are cut out on rod 35 such that edges 39 of barbs 37 will engage the fibers of the staged composite laminate upon insertion thereby providing an anchoring effect. Head 41 of barbed quill 33 is generally flat to provide a driving surface. Such a head is normally needed unless the laminate is thick (where there would be more anchoring to prevent the quills from being pulled from the soft laminate). FIG. 3 illustrates another type of quill generally indicated by 43 which would normally be used for a laminate which would be relatively thicker than the type quill 33 is best suited for. Thus, quill 43 has a rod 47 having a portion 48 adjacent head 51 of constant section. This prevents the thickness of rod 47 near head 51 from becoming unacceptably large due to the increasing taper from point 53.

The material used for the quills should be one that is compatible with composite material. Normally this would be a metallic material. Applicant has found that titanium (or an alloy thereof) is particularly suitable due to its high strength to weight ratio.

With reference again to FIG. 1, a row of barbed metallic quills such as illustrated in FIG. 2 or 3 is imbedded in each of fillet portions 28 of sheets 20 and 22, through filler material 30 and into cover 18. Quills according to the present invention can be inserted into the composite structure in the staged condition very quickly, such as by impact hammer or optimally by ultrasonic gun. Suitable ultrasonic guns are manufactured by the Sonobond Corporation located in Westchester, Pennsylvania. After placing quills such as the type 33 or 43 into contact with composite sheets 20 and 22, the ultrasonic gun causes such quills to vibrate while forcing them into the composite sheets. This vibration heats up the quills and in so doing softens the staged epoxy resin which aids parting of the composite fibers of sheets 20 and 22 by making them more pliable. In combination with the pointed and tapered shape of the quills, this results in minimal fiber damage (which otherwise would impair structural strength). Quills 12 are oriented at an angle (which is preferably about 45°) with respect to cover 18. Alternatively, or in addition to quills 12, respective rows of quills 14 are imbedded on opposite sides of web 16 adjacent to the interface between respective portions 24 and fillet portions 28 such that one row of quills 14 is imbedded in sheet 20 and panel 18, while the other row of quills 14 is imbedded in sheet 22 and panel 18. Thus, quills 14 are positioned approximately where fillet portions 28 join panel 18. The rows of quills 14 can be positioned at or on either side of the interface (on each side of web 16) between portions 24 and fillet portions 28. Spacing of quills 12 and 14 along their respective rows is a matter of design choice. The length of quills 12 and 14 should be such that there is no protrusion below cover 18.

Figure 4:
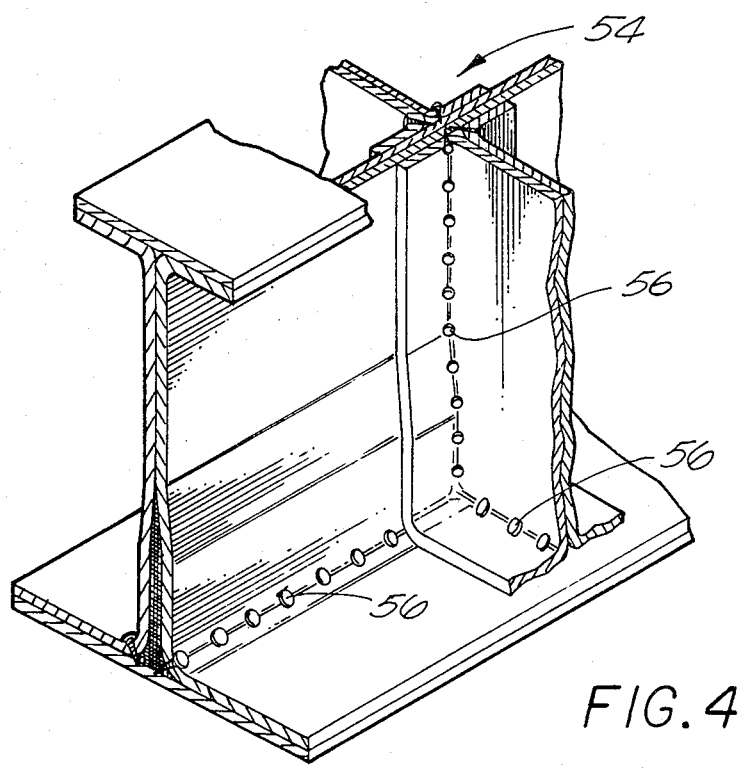
FIG. 4 is a perspective view of a composite structure illustrating headed barbed quills as used in both assembly and strengthening of the structural joints.

FIG. 4 illustrates a complex composite structure generally indicated at 54 where rows of barbed titanium quills 56 are used in joining the assembly in the staged condition. The quills 56, like quills 12 and 14 of FIG. 1, allow for lay-up and co-curing of the composite structure as opposed to curing of each of the individual parts prior to lay-up and curing of the entire assembly. With Applicant's invention, subsequent to lay-up, the individual parts and structure as a whole are co-cured in one operation. This allows large structures, such as a wing box which is illustrated in FIG. 4, to be co-cured. It further saves time and expense of multiple curing operations and difficulty in joining of rigid cured parts. The barbed quills also add strength to the structural joints as more fully described hereinafter.

Curing of the assembly, such as 54, is accomplished by thermosetting on the application of heat and pressure to the composite structure. Typically, when curing an assembly such as that shown in FIG. 4 which is of graphite epoxy material, the assembly would be placed in an autoclave or oven and heated to a temperature of about 350° F. for about one hour whereupon the panels of the structure become tough and have a permanent shape retention and the assembly itself becomes permanently joined. The quills which are infixed in the structure become even more anchored in the structure by virtue of the resin locking around the barbs of the quills during curing.

With reference again to FIG. 1, under normal conditions, without the infixing of the quills of the present invention, a tension load applied to panel 18 would, at undesirably low levels, cause a peeling of web 16 from panel 18 at fillet areas 28. However, by virtue of quills 12 and/or 14, which add tensile strength due to the rod of the quills and especially due to the barbs which anchor the quill in place by interaction with the composite fibers and by virtue of the cured resin which locks around the barbs, the joint is substantially strengthened and resistance to peel increased. It has been found that a row arrangement of quills 12 and 14, such as illustrated in FIG. 1, is a particularly effective arrangement for reinforcing structure 10. This is basically due to the strengthening by quills 12 of the joining of the web 16 at its tangent point connection to filler material 30 (or load coupler 60—see FIG. 6) where peel forces are greatest and the strengthening by quills 14 which directly oppose a tension load on panel 18 at the area where fillet portion 28 joins panel 18 (where peeling normally initiates).

Figure 5:
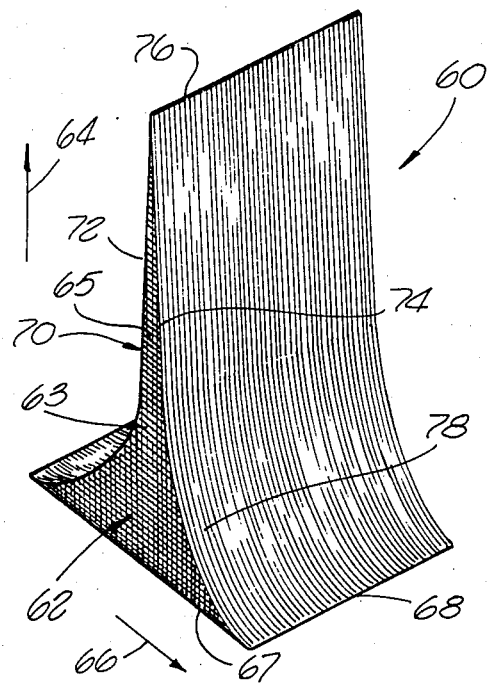
FIG. 5 is a perspective view of a reinforcement member.

FIG. 5 illustrates a load coupler or reinforcement member generally indicated at 60. Reinforcement member 60 is normally formed as a multilayer laminate by blanking the desired shape from sheets of composite material. The layers or sheets of the laminate are of uniform size and shape and are stacked to the desired length to form reinforcement member 60. The layers are bonded together by means of a thermosetting resin which is contained in the material itself when acquired in preimpregnated form.

Consideration must be given to the fiber orientation in stacking the layers of the laminate and it is important that the fibers of the laminate run in at least two directions. This is illustrated on face sheet 62 of reinforcement member 60 where longitudinal fibers 63 run in the direction of arrow 64 and transverse fibers 65 in the direction of arrows 66. For most embodiments, the longitudinal and transverse fibers will optimally be orthogonally oriented. Normally, this will take the form of a 0°/90° orientation where the 0° axis is parallel to the flat bottom 67 of base 68 of member 60. Thus, the transverse fibers are 0° fibers and the longitudinal fibers are 90° fibers. It should of course be understood that other orientations can be used, such as −45°/45°, 0°/85°, etc., depending upon the particular geometry of the reinforcing member 60 and/or the joint to be reinforced.

As can be seen in FIG. 5, reinforcement member (load coupler) 60 is generally wedge-shaped. In this regard, it is meant that the structure has an enlarged base with sides tapering to a thin edge. Member 60 is generally defined by a shank 70 and a base 68. Shank 70 has two longitudinal sides 72 and 74 which converge or taper to a thin upper edge 76. While the interface between shank 70 and base 68 is not specifically delineated in that each layer of the laminate is preferably integral, such can be approximated by considering the transition at a fillet area 78 on each side of member 60. Thus, base 68 extends arcuately outward from shank 70. By virtue of this diverging arcuate contour and flat bottom 67 of base 68, it is seen that the base is tapered as it extends from shank 70.

It can now be seen that a flatwise tension load on the bottom face 67 of base 68 through longitudinal fibers 63 and the connected transverse fibers 65. Since the great majority of fibers terminate at the longitudinal sides 72 and 74 of shank 70, the bulk of a tension force on bottom face 67 is transferred to the longitudinal sides 72 and 74 along fillet areas 78.

Figure 6:
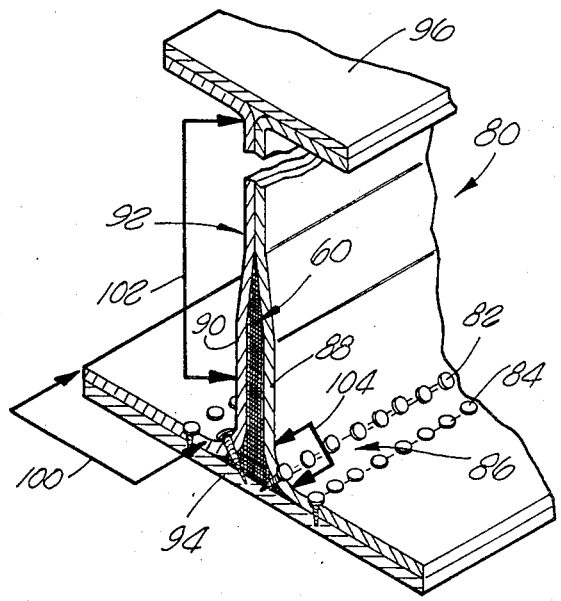
FIG. 6 is a perspective view of a reinforced composite structure illustrating a joint strengthened by a reinforcement member in combination with headed barbed quill fasteners.

FIG. 6 illustrates a reinforced composite structure generally indicated at 80 which utilizes a combination of the load coupler 60 and barbed quills 82 and 84. Such a combination substantially strengthens the structural joint generally indicated at 86 which is defined by opposed sheets 88 and 90 making up a web generally indicated at 92 and composite panel or skin 94. Normally web 92 would be joined to upper panel or spar cap 96. A portion 100 of sheets 88 and 90 is positioned parallel and adjacent to panel 94. A second portion 102 of sheets 88 and 90 extends tranversely to panel 94. In the embodiment illustrated in FIG. 6, second portion 102 is approximately orthogonally disposed to panel 94. Sheets 88 and 90 also have a fillet portion 104 between first portion 100 and second portion 102. Load coupler 60 is positioned between sheets 88 and 90 of web 92 and panel 94 such that the bottom face 67 of coupler 60 rests directly on (or is imbedded in) panel 94. As can be seen in FIGS. 5 and 6, the longitudinal fibers of reinforcement member 60 are parallel to the center line (not shown) of web 92 and transverse fibers are parallel to panel 94. It has been, found that this is normally the optimal configuration of such fibers. Thus, a flatwise tension load on panel 60 is distributed through member 60 to sides 72 and 74 where there is a double shear bond joint to web 92. This effectively bypasses the peel prone fillet areas 104 because the great majority of fibers of member 60 terminate above fillet areas 104.

Barbed quills 82 and 84 are placed in the fillet areas 104 through member 60 and into panel 94 as set forth previously. This holds the staged assembly together to enable co-curing as previously described and also strengthens structural joint 80.

Thus it is apparent that there has been provided, in accordance with the invention, a reinforced composite structure and method of fabrication thereof that fully satisfies the objectives, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and scope of the appended claims.

What is claimed is:

1. A reinforced composite structure comprising:
   a staged composite panel, said panel having a plurality of fiber composite plies, said plies being adhesively bonded together;
   a staged composite web, said web having at least one sheet of fiber composite material, said sheet having at least one layer, said sheet having three portions, a first portion positioned parallel to said panel, a second portion positioned transversely to said panel, and a fillet portion between said first and second portions; and
   a plurality of quills infixed in said web and said panel, said quills having barbs thereon, said barbs engaging the fibers of said panel and said web, said quills joining said fillet portion to said panel whereby said panel and said web can be co-cured as assembled.

2. The reinforced composite structure of claim 1 wherein said quills have a head and a rod, said barbs are provided on said rod, said rod is positioned approximately perpendicular to said head, said rod having a pointed distal end, and said quills are positioned such that the structure is reinforced when cured.

3. The reinforced composite structure of claim 1 wherein said quills are positioned adjacent to the interface between said first portion and said fillet portion.

4. The reinforced composite structure of claim 2 wherein said quills are positioned adjacent to the interface between said first portion and said fillet portion.

5. The reinforced composite structure of claim 4 wherein said quills are metallic and said rod has at least a portion thereof tapered to said distal end.

6. The reinforced composite structure of claim 3 also including a composite reinforcement member, said member comprising a generally wedge-shaped laminate, said laminate being defined by a shank and a base, said shank adjoining said base, said shank having two longitudinal sides, said base extending arcuately outward from said shank, said base being tapered in thickness as it extends from said shank, said laminate having a plurality of fiber composite sheets of uniform size and shape, said sheets of said laminate being adhesively bonded together, said sheets of said laminate being arranged such that the fibers thereof substantially distribute a tension load on said base as a shear load along said longitudinal sides of said shank, said reinforcement member being bonded to said web and said panel, said base adjoining said panel and said fillet portion of said web, and said shank adjoining said second portion of said web, said quills being infixed in said reinforcement member.

7. The reinforced composite structure of claim 4 also including a composite reinforcement member, said member comprising a generally wedge-shaped laminate, said laminate being defined by a shank and a base, said shank adjoining said base, said shank having two longitudinal sides, said base extending arcuately outward from said shank, said base being tapered in thickness as it extends from said shank, said laminate having a plurality of fiber composite sheets of uniform size and shape, said sheets of said laminate being adhesively bonded together, said sheets of said laminate being arranged such that the fibers thereof substantially distribute a tension load on said base as a shear load along said longitudinal sides of said shank, said reinforcement member being bonded to said web and said panel, said base adjoining said panel and said fillet portion of said web, and said shank adjoining said second portion of said web, said quills being infixed in said reinforcement member.

8. A reinforced composite structure comprising:
   a composite panel, said panel having a plurality of fiber composite plies, said plies being bonded together;
   a composite web, said web having at least one sheet of fiber composite material, said sheet having at least one layer, said sheet having three portions, a first portion positioned parallel to said panel, said first portion being bonded to said panel, a second portion positioned transversely to said panel, and a fillet portion between said first and second portion;
   a composite reinforcement member, said member comprising a generally wedge-shaped laminate, said laminate being defined by a shank and a base, said shank adjoining said base, said shank having two longitudinal sides, said base extending arcuately outward from said shank, said base being tapered in thickness as it extends from said shank, said laminate having a plurality of fiber composite sheets of uniform size and shape, said sheets of said laminate being adhesively bonded together, said sheets of said laminate being arranged such that the fibers thereof substantially distribute a tension load on said base as a shear load along said longitudinal sides of said shank, said reinforcement member being bonded to said web and said panel, said base adjoining said panel and said fillet portion of said web, said shank adjoining said second portion of said web; and
   a plurality of quills infixed in said panel, said reinforcement member, and said web.

9. The reinforced composite structure of claim 8 wherein said quills have a head and a rod, said barbs are provided on said rod, said rod is positioned approximately perpendicular to said head, said rod having a pointed distal end, and said quills are positioned to reinforce the structure.

10. The reinforced composite structure of claim 8 wherein said quills are positioned adjacent to the interface between said first portion and said fillet portion.

11. The reinforced composite structure of claim 9 wherein said quills are positioned adjacent to the interface between said first portion and said fillet portion.

12. The reinforced composite structure of claim 9 wherein said quills are metallic, and said shank has at least a portion thereof tapered to said distal end.

13. A method of forming a composite structure which comprises:
  providing a composite panel and a composite web, said panel having a plurality of fiber composite plies, said plies being bonded together, said web having at least one sheet of fiber composite material, said sheet having at least one layer, said sheet having three portions, a first portion and a second portion which are divided by a fillet portion;
  staging said panel and said web;
  positioning said panel relative to said web such that said first portion is positioned parallel to said panel and said second portion is positioned transversely to said panel;
  infixing a plurality of quills in said web and said panel while said web and said panel are in a staged condition such that said web is joined to said panel, said quills having barbs thereon, said barbs engaging the fibers of said panel and said web; and
  co-curing said web and said panel as joined.

14. The method of claim 13 wherein said infixing of said quills is such that said quills are positioned to reinforce said structure when cured.

15. The method of claim 14 wherein said quills are positioned adjacent to the interface between said first portion and said fillet portion.

16. The method of claim 15 wherein said quills have a head and a rod, said bars are provided on said rod, said rod is positioned approximately perpendicular to said head, and said rod has a pointed distal end.

17. The method of claim 16 wherein said quills are metallic and said rod has at least a portion thereof tapered to said distal end.

* * * * *